US007015609B2

(12) United States Patent
Fahrenbach

(10) Patent No.: US 7,015,609 B2
(45) Date of Patent: Mar. 21, 2006

(54) MACHINE WITH A HIGH-SPEED ROTOR

(75) Inventor: Peter Fahrenbach, Braunfels (DE)

(73) Assignee: Pfeiffer Vacuum GmbH, Asslar (DE)

( * ) Notice: Subject to any disclaimer, the term of this patent is extended or adjusted under 35 U.S.C. 154(b) by 158 days.

(21) Appl. No.: 10/369,901

(22) Filed: Feb. 20, 2003

(65) Prior Publication Data

US 2003/0160528 A1 Aug. 28, 2003

(30) Foreign Application Priority Data

Feb. 28, 2002 (DE) ................................ 102 08 795

(51) Int. Cl.
*H02K 5/00* (2006.01)

(52) U.S. Cl. ........................................ 310/89; 415/196

(58) Field of Classification Search ............ 310/85–89; 415/196, 197
See application file for complete search history.

(56) References Cited

U.S. PATENT DOCUMENTS

| | | | | |
|---|---|---|---|---|
| 3,053,189 A * | 9/1962 | White | ........................ | 417/357 |
| 3,867,658 A * | 2/1975 | Dochterman | ................. | 310/71 |
| 5,977,665 A * | 11/1999 | Hartmann et al. | ............ | 310/51 |
| 6,365,998 B1 * | 4/2002 | Kech et al. | ................. | 310/194 |
| 6,491,131 B1 * | 12/2002 | Appleyard | .................. | 180/444 |

OTHER PUBLICATIONS

Federal Register, vol. 65, No. 120, pp. 38510-38516, Jun. 21, 2000.*
Federal Register, vol. 64, No. 146, pp. 41392-41394, Jul. 30, 1999.*

* cited by examiner

*Primary Examiner*—Dang Le
(74) *Attorney, Agent, or Firm*—Abelman, Frayne & Schwab

(57) ABSTRACT

A machine, having a high-speed rotor, and stationary components having connection surfaces for connecting the machine with external components and/or the stationary components with each other and provided with outer surface layers having a high friction coefficient.

4 Claims, 2 Drawing Sheets

MACHINE WITH A HIGH-SPEED ROTOR

BACKGROUND OF THE INVENTION

1. Field of the Invention

The present invention relates to a machine including a high-speed rotor and stationary components having connection surfaces for connecting the machine with external components and for connecting the stationary components with each other, in case they are formed of separate sections.

2. Description of the Prior Art

In machines with a high-speed rotor, such as vacuum pumps or centrifuges, because of the high rotational speed of the rotor, a large amount of energy is stored in the rotor. At a rotor/stator crash, this energy is transmitted to other system components by stationary components of the machine, e.g., by connection flanges, bottom parts and the like. The transmitted torque can lead to damage or destruction of the components of the system connected with the machine or can lead to tear off the connections within the machine and, thus, to danger for the personnel serving the machine.

In vacuum plants, in case of a crash, as a rule, leakage takes place, which noticeably adversely affects the running process, which should be interrupted. Also, in vacuum plants or the like, in case of a crash, toxic gases can be released, which leads to contamination of the environment.

The connection elements, e.g., those provided between a plant and a vacuum pump connected with the plant, such as pump flanges, bearing flanges, centering rings, brackets, bottoms, or elements of the pump itself, such as bottoms, spacers, housing, are formed, as a rule, of aluminum or steel. Often these parts are enameled or nickel-plated to protect them from corrosion. The enamel or nickel layer reduces the friction coefficient of respective surfaces. However, the friction coefficient greatly influences the torsional reliability of the pump or pump components.

In order to increase the torsional reliability, fastening elements, e.g., screws or bolts which connect the vacuum pump with external components, can be reinforced or their number can be increased. However, both reinforcing of fastening elements and increase of their number are associated with the use of expensive constructions and with high costs. Moreover, the number of connection possibilities are often limited by existing norms or standards.

Accordingly, an object of the present invention is to provide a machine with a high-speed rotor with which a serious damage of the connections of the machine with external components and/or connections within the machine in case of a stator/rotor crash is prevented.

Another object of the invention is to provide a machine with a high-speed rotor with which damage of the connections of the machine with the external components or within the machine in case of a stator/rotor crash is prevented, and which machine would be as expensive as conventional machines and with which the connection possibilities would not be limited by existing norms or standards.

SUMMARY OF THE INVENTION

This and other objects of the present invention, which will become apparent hereinafter, are achieved by providing a machine having a high-speed rotor and stationary components having connection surfaces for connecting the machine with external components and/or for separate components or sections of the machine and which are provided with surface layers having a high friction coefficient.

The provision of connection surfaces having a high friction coefficient permits to prevent a rotational movement of the machine relative to external components and/or sections of the machine relative to each other, e.g., in case of a rotor/stator crash. The construction of the machine according to the present invention provides for its relatively inexpensive manufacturing, with the connections meeting the requirements of the existing norms and standards.

The novel features of the present invention, which are considered as characteristic for the invention, are set forth in the appended claims. The invention itself, however both as to its construction and its mode of operation, together with additional advantages and objects thereof, will be best understood from the following detailed description of preferred embodiments, when read with reference to the accompanying drawings.

DETAILED DESCRIPTION OF THE PREFERRED EMBODIMENTS

Figure 1:
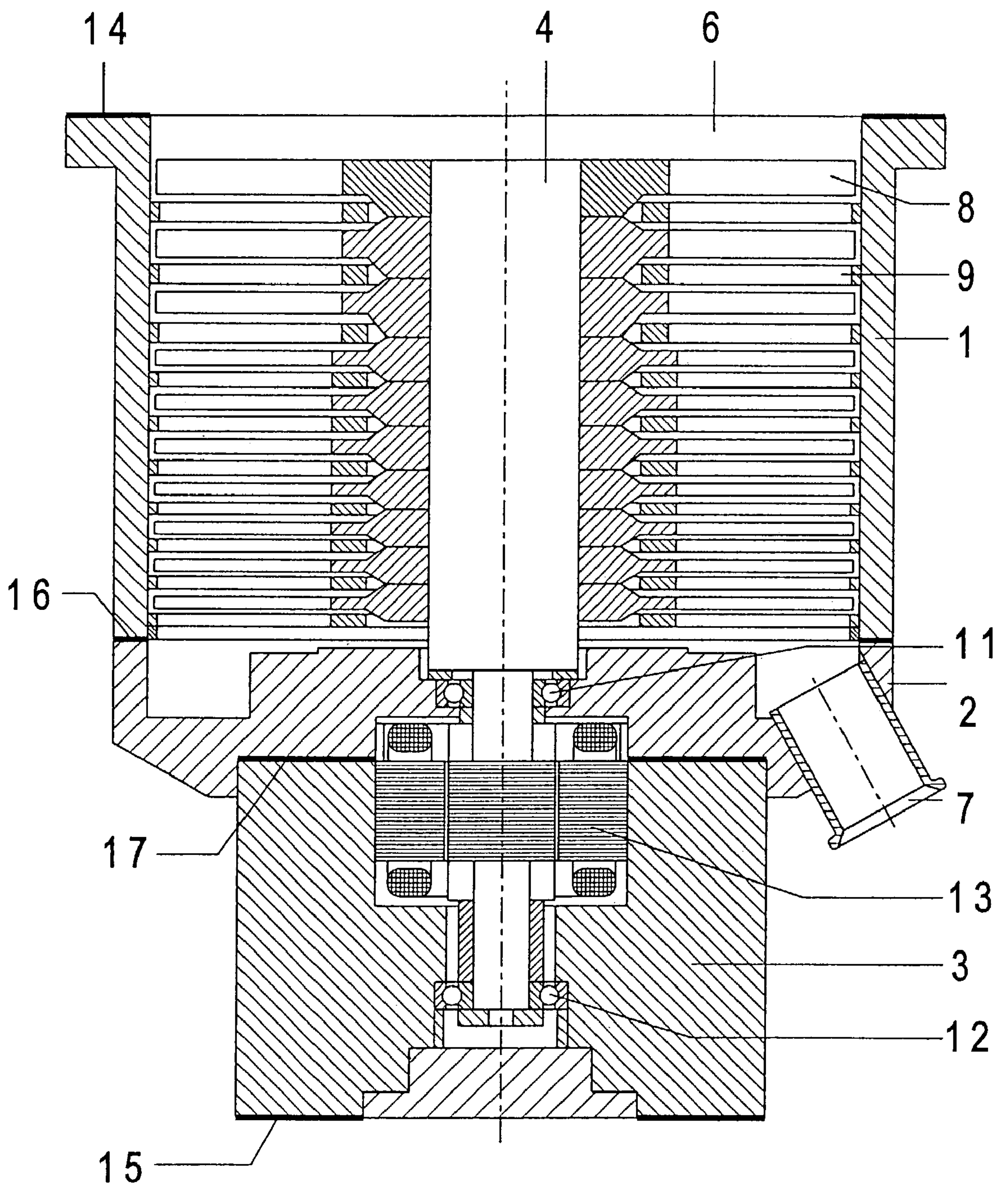
FIG. 1 a cross-sectional view of a first embodiment of a machine with a high-speed rotor according to the present invention.
Figure 2:
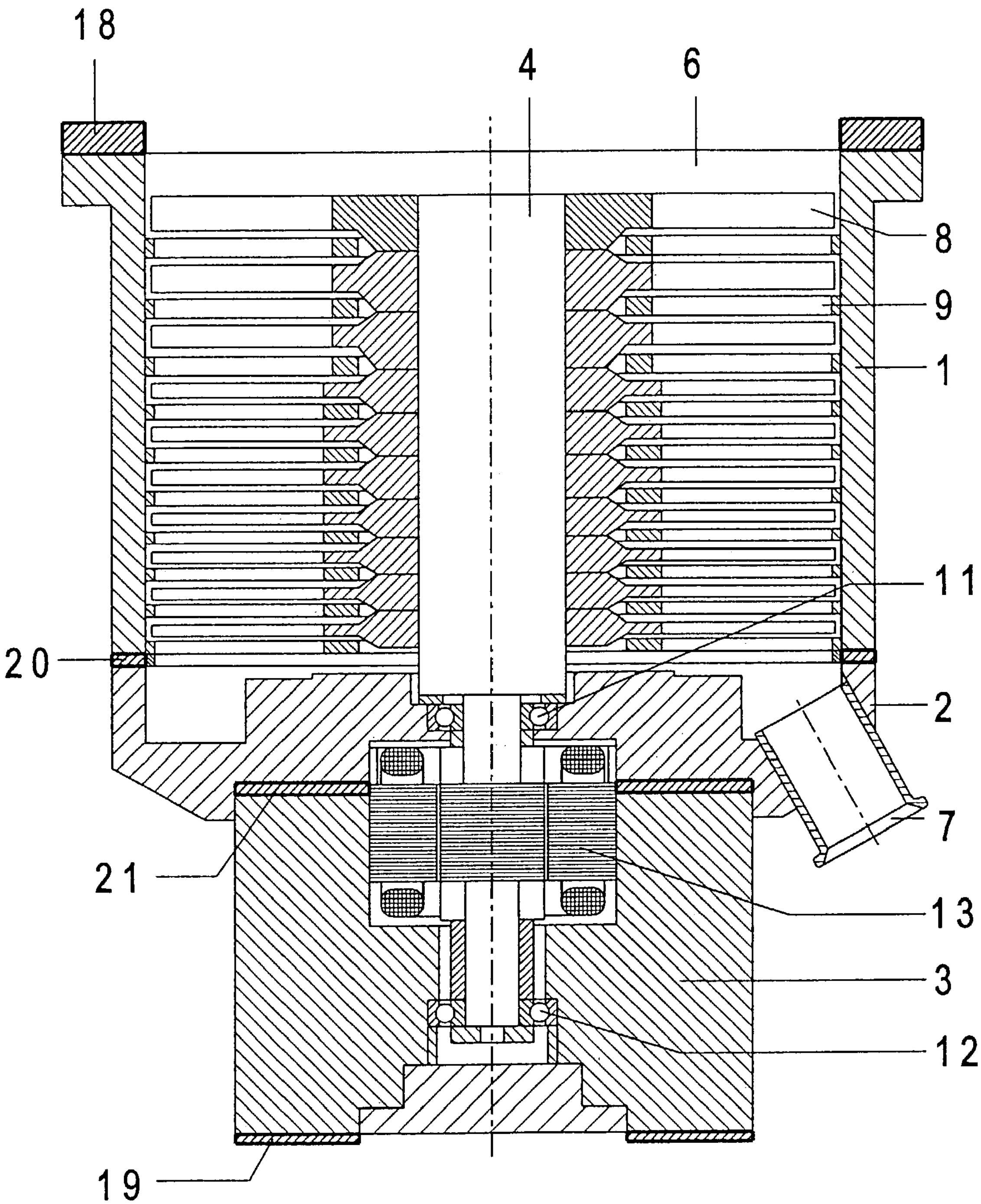
FIG. 2 a cross-sectional view of a second embodiment of a machine with a high-speed rotor according to the present invention.

FIGS. 1 and 2 show different embodiments of a pump which represents a machine with a high-speed rotor according to the present invention. The pump has a housing formed, in the examples shown in the drawings, of three sections. In the upper section 1, there are located pumping elements formed of rotor discs 8 and stator discs 9. A suction opening 6 for connection with a recipient is also provided in the upper section 1. In the middle section 2, there are provided a forevacuum region and an outlet opening 7. In the third art bottom section 3, there are provided a drive motor 13 and elements of a support 12. The rotor discs 8 are fixedly mounted on the rotor shaft 4 for joint rotation therewith. The rotor shaft is supported in bearings 11 and 12 and is driven by the drive motor 13.

A connection surface 14 connects the upper section 1 to a bearing component, e.g., a recipient. The lower or bottom section 3 is secured with a connection surface 15, e.g., to a base plate. Further connection surfaces 16, 17 are provided, respectively, between the upper and middle sections 1 and 2 and between the middle and bottom sections 2 and 3.

The connection surfaces 14–17 between the housing and external components and between the housing sections are provided, according to the invention with surface layers having an increased friction coefficient. According to the invention, the surface layers can be formed of coating layers having an increased friction coefficient or be provided with an appropriate mechanical structure. Also, intermediate components, e.g., centrifuges can be provided with appropriate coatings or structures, which contributes to the solution of the problem the present invention solves.

According to the invention, only one, several, or all of the connection surfaces can be formed with a surface layer having an increased friction coefficient.

In the embodiment shown in FIG. 2, there are provided between the sections 1 and 2 and 2 and 3, respectively, components 20, 21 having outer surface layers with a high friction coefficient and formed by an appropriate coating or a mechanical structure.

The outermost connection surfaces, upper connection surface and bottom connection surface, of the housing can be connected with external components 18, 19, respectively, having surface layers formed either by a high friction coating or a mechanical structure having a high friction coefficient.

Though the present invention was shown and described with references to the preferred embodiments, such are merely illustrative of the present invention and are not to be construed as a limitation thereof and various modifications of the present invention will be apparent to those skilled in the art. It is therefore not intended that the present invention be limited to the disclosed embodiments or details thereof, and the present invention includes all variations and/or alternative embodiments within the spirit and scope of the present invention as defined by the appended claims.

What is claimed is:

1. A machine, comprising a high-speed rotor; a stator; and stationary components releasably connected with external components, wherein the stationary components have connection surfaces along which the stationary components of the machine are connected with external components and which are coated with outer surface layers having a high friction coefficient for preventing a rotational movement of the machine relative to the external components in case of a rotor/stator crash.

2. A machine according to claim 1, wherein the outer surface layers are formed with a mechanical structure characterized by a high friction coefficient.

3. A machine according to claim 1, wherein the outer surface layers are formed by coating layers having a high friction coefficient.

4. A machine according to claim 1, wherein the connection surfaces adjoin external components having one of a coating having a high friction coefficient and a mechanical structure characterized by a high friction coefficient.

* * * * *